J. N. McFATE AND H. L. GLAZE.
TIRE.
APPLICATION FILED APR. 23, 1918.
1,352,074.
Patented Sept. 7, 1920.
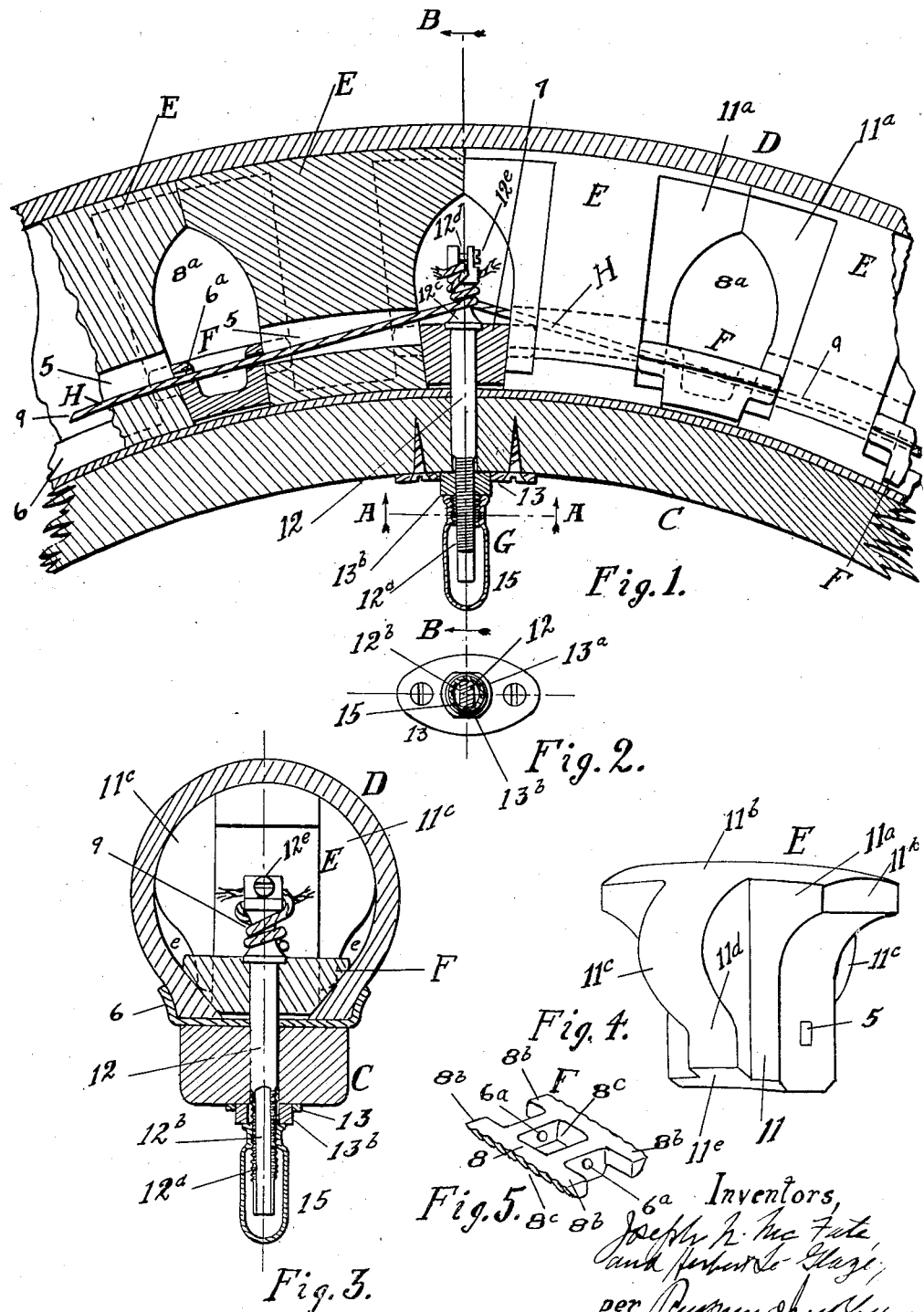

UNITED STATES PATENT OFFICE.

JOSEPH N. McFATE, OF PHOENIX, ARIZONA, AND HERBERT L. GLAZE, OF LOS ANGELES, CALIFORNIA; SAID GLAZE ASSIGNOR OF FOUR-TENTHS OF HIS RIGHT TO SAID McFATE.

TIRE.

1,352,074.　　　　Specification of Letters Patent.　　Patented Sept. 7, 1920.

Application filed April 23, 1918. Serial No. 230,338.

*To all whom it may concern:*

Be it known that we, JOSEPH N. McFATE and HERBERT L. GLAZE, both citizens of the United States, residing, respectively, at Phoenix, in the county of Maricopa and State of Arizona, and Los Angeles, in the county of Los Angeles and State of California, have invented new and useful Improvements in Tires, of which the following is a specification.

This invention relates to tires, and more particularly to tires in which solid compressible cushion members are employed within the casing, in contradistinction from a fluid cushion element, such as an air cushion, and it has for its object to provide an improved tire of this character which will be superior in point of relative inexpensiveness and simplicity, taken in conjunction with increased durability, length of life, facility in assembling, disconnecting and replacing of parts, freedom from liability to get out of order or failure in service, and capable of being positively maintained in working condition or condition for service, and which may be conveniently and effectively assembled and put into condition for service, and which will in all general respects be superior in efficiency and serviceability.

With the above and other objects in view, the invention consists in the novel and useful provision, formation, construction, combination and association of parts, members and features, all as hereinafter described, shown in the drawing, and finally pointed out in claims.

In the drawing:

Figure 1 is a detail fragmentary circumferential sectional view of a vehicle wheel felly and rim with which is associated a tire constructed and organized in accordance with the invention;

Fig. 2 is a detail transverse sectional view of the same, taken upon the line A—A, Fig. 1, and looking in the direction of the appended arrows;

Fig. 3 is a detail radial sectional view, taken upon the line B—B, Fig. 1, and looking in the direction of the appended arrows;
Fig. 4 is an isometric detached view of one of the tire cushion members utilized in practising the invention, and of which a plurality are shown in assemblage in Fig. 1; and Fig. 5 is an isometric view of a wedge or spacer element in detached position, a number of such wedge or spacer elements being indicated in Fig. 1, and the same being provided in installation in alternation with the cushion members such as shown in Fig. 4.

Corresponding parts in all the figures are designated by the same reference characters.

Referring with particularity to the drawing, C designates the felly and 6 designates the rim of a vehicle wheel, to which is shown applied a tire constructed in accordance with the invention and including or comprising an outer casing D and a plurality of cushion members E which are disposed between such casing D and the rim 6. The casing D is held to the rim and thereby to the felly in the usual or any preferred manner, and with the rim entirely incloses a cushion space, indicated in part at *e*, and within which are disposed the elements, namely, the cushion members E, whereby resilience and spring quality is given to the tire.

Alternating with the cushion members E are the wedge or spacer elements F which serve to maintain in proper spaced relation the cushion members E, and which wedge or spacer elements, together with the cushion members E, comprise a continuous series of parts extending in annular formation around the rim 6.
H designates means for binding together the cushion members E and the spacer members F in working relation and firmly holding the same upon the rim 6. G designates means for adjusting and tightening the means H and holding said means H in operative condition to bind the members E and F to the rim 6, as stated.

Each of the cushion members E, as particularly shown in Fig. 4, comprises a central body portion 11 having substantially opposite parallel bearing faces lying in planes extending circumferentially of the wheel. The body portion 11 in each instance is developed into an enlarged crown or head 11$^a$, which lies in the same plane as the body 11, and the upper or outer surface of which is curved both circumferentially of the wheel and transversely of the wheel, as at 11$^b$ to fit and conform to the curvature of the inner wall of the casing D. Curved abutments 11$^c$ project from the opposite parallel faces of the body 11, in the median portion of such body, and the surface curvature thereof dives into and conforms with the transverse surface curvature of the crown or head $11^a$, which curvature is indicated at $11^b$. Such curvature of such abutments $11^c$, however, is abruptly increased in pitch toward the inner terminal portions of such abutments, as at $11^d$, whereby open space is normally provided within the casing internal chamber $e$, to permit of play of the material of such cushion member E, in the compression and expansion thereof, responsive to the pressure of the load exerted upon such cushion member, such expansion and contractions accompanying variations in such load pressure responsive to rotation of the respective wheel. The normal curvature of such abutments, $11^c$, fits and conforms to the inner curved wall of the casing D, as clearly indicated in Fig. 3.

The inner terminal portions of the abutments $11^c$, beneath the curved portions $11^d$ thereof, and the extreme inner terminal portion of the central body 11, are included within the beveled or chamfered formation, at each side of the cushion member, as at $11^e$, to conform to the formation of the casing D or the portions thereof next adjacent to the rim 6.

Alternating with the cushion members E are the wedge or spacer members F which comprise each a central body portion 8 which may be cored out or chambered, as at $8^d$, for lightness, without surrender of strength, and from which body 8 project at each end spaced prongs $8^b$. The outer sides of the body and of the prongs may be roughened or serrated as at $8^c$ to firmly engage the same frictionally with the inner wall of the casing, and are slanted inwardly for wedge action at the bottom of the inner walls of the casing. Each of the members F will readily be stamped or struck out of metallic blanks, or, if preferred, may be cast, or may be molded or otherwise formed of any suitable material.

The prongs $8^b$ are so spaced apart at each end of the member F as to engage one of the abutments $11^c$ of the next adjacent cushion member E; and as indicated clearly in Fig. 1 and in Fig. 3, these spacer elements are introduced between adjacent cushion elements E, with each pair of prongs $8^b$ engaging one of the adjacent abutments $11^c$, and such spacer elements are wedged firmly down into the space between adjacent cushion elements, so as to firmly position the same within the casing D.

Registering openings 5 and $6^a$ are provided in a series throughout the assemblage of cushion members E and spacer members F, the openings 5 being in the members E, the openings $6^a$ in the other mentioned members; and through such series of registering openings is passed a length 9 of suitable wire, cable or other material of high tensile strength, the same serving as a binding member for cinching the elements E and F down upon the rim 6, in complete assemblage. The ends of this cable or similar length 9, are brought together and attached to the outer end of a tightening pin 12 which is rotatably mounted in corresponding radial bores in the felly C, rim 6, and spacer member 7. This spacer member 7 is constructed the same and operates the same as the spacer members F, save and except that it is devoid of the binding wire holes $6^a$, and is further provided with a thickened body 8, being bored, as stated, to receive the pin 12 rotatably. This pin 12 likewise extends inwardly of the felly, passing through a perforated plate 13 applied to the felly between two of the spokes thereof, and has a flat-sided opening $13^a$ adapted to receive a correspondingly formed locking ring $13^b$ which is slidably mounted upon the threaded inner projecting end $12^a$ of the pin 12, and which pin is flattened at opposite sides as at $12^b$ throughout the threaded portion and to the extreme inner end thereof. The extreme inner end of the pin 12 is devoid of threads, its flattened sides forming a square for receiving a wrench or other device for turning the pin. A screw cap 15 is applied to the pin 12, at its threaded portion $12^a$, holding the locking ring $13^b$ in the flat-sided opening $13^a$ in the plate 13, to prevent rotation of the pin 12 after it has been sufficiently rotated by a wrench, as described, to give the binding wire 9 one or more turns about the inner end of the pin, or the reduced portion thereof, as at $12^c$, to put the cushion members and spacer members under pressure and hold the same firmly against the rim 6. The ends of the binding wire 9 are passed through a cut or kerf $12^b$, in the outer end of the pin 12, and are bound therein by a screw threaded through such slotted portion of the outer end of the pin, such screw being shown at $12^e$.

The operation, method of use, and advantages of the improved tire construction, and the improved features thereof, entering into and comprised within the invention, and embodying the same, will be readily understood from the foregoing description, taken in connection with the accompanying drawing, and the following statement:

The members E and F are assembled together in alternation in the casing D, and said casing is then installed upon the rim 6 in the usual manner. In so assembling such members they are threaded upon the binding wire 9, bead fashion, and in so assembling the members, the pin 12 is installed in place in the spacer element 7 which is particularly adapted for it as described, and the ends of the binding wire 9 are firmly secured to the extreme inner end of such pin and so held by tightening down the binding screw 12ᵉ. In placing the casing and its contained elements E and F and binding wire 9 and pin 12, upon the rim, such pin 12 is passed through the registering openings in the felly and rim, in the same manner as the air tube with its valve is put in place in applying a pneumatic tire to the rim and felly of the wheel. This brings the inner end of the pin 12 through the plate 13 and its opening 13ª, in position for manipulation by a wrench or to receive the cap 15 to hold the locking ring 14 in place, after the cinching down and tightening of the members E and F by the binding wire 9. The cushion members or elements E, the square ends of the crowns or heads 11ª all of which abut against each other in a continuous series of such heads extending throughout the tire, are the active elements of the tire from the standpoint of resilience and spring quality, and such elements are preferably formed of rubber, rubber substitute, or any suitable material having sufficient resilience and spring quality, together with sufficient stability to perform their function of supporting the load which is imposed upon the wheel. It will be seen that these members E are permitted a material degree of compression, which is accommodated by the open spaces, indicated at 8ª, over which arch the abutting ends of the heads or crowns 11ª, and within which open spaces the spacer or wedge elements F are installed. Likewise, this compression is accommodated by the materially open space, as at e, at each side of each element E, and adjacent to the abruptly curved portions 11ᵈ of the abutments 11ᶜ. Thus the expanding and contracting of such elements, in the resilient play of the same responsive to imparting of the load to the roadway through the casing, in the rotation of the wheel, are provided for and accommodated within the casing D, and without distortion of the casing or variation of its evenly curved surface presented to the roadway.

The spacer elements F maintain the cushion elements E, in proper fixed relation each to the others, in a working series around the rim, circumferentially, and the binding wire 9 suitably tightened by the tightening means G maintains the entire assemblage of elements E and F in proper working relation and positioned upon the rim 6 and within the casing D.

Due to the fact that the crown or head portions 11ª abut each other at their squared ends 11ᶠ, there is provided a continuous secondary tread formation within the casing, for a protective covering of the casing, and curved uniformly both transversely and circumferentially of the wheel, to conform to the curvature of the casing D.

We thus provide a continuous resiliently yielding arched tread organization, firmly held in place and to the rim, within the casing, and by which the tire is given a resilient or spring quality accompanied by an efficient load-sustaining quality; and which organization may readily and conveniently be assembled together, and also disassembled or dismantled to introduce, if required, fresh elements, or repair or replace any broken or damaged part which under any circumstance might require such treatment. It will be noted that the wedge or spacer elements F are slightly beveled or inwardly inclined at their side edges, thus tending to wedge the casing D at its side walls between the flanges on the rim 6 so as to firmly hold the tire parts in assemblage upon the rim.

The present tire provides full and sufficient resilience with its other features of advantage, and at the same time is punctureproof, thus overcoming the principal objection to the pneumatic tire.

It is manifest that many changes and variations may be made in the construction and formation and inter-relation and mode of application of parts, members and features, in distinction from the disclosure of the foregoing description and statement and drawing, in adapting the invention to varying conditions of use or service or to the varying preference, without departing from the true spirit of the invention.

Having thus disclosed our invention, we claim and desire to secure by Letters Patent:

1. In a tire, a series of similar and interchangeable cushion members adapted to be disposed between the casing and the rim of the wheel and provided at their outer ends with coengaged arched portions projecting circumferentially of the wheel over intermediate spaces accommodating compression, said cushion members being provided with lateral abutments also arching over further spaces accommodating compression, the outer faces of the said arched projecting portions conforming to the shape of the casing, spacer elements interposed between the faces of the cushion members, and means for binding such cushion members and spacer elements down upon the rim of the wheel in a continuous series.

2. In a tire, a plurality of independent and interchangeable cushion members adapted to be disposed between the casing and the rim and having spaced base portions, while the outer ends thereof are enlarged longitudinally to arch over the said spaces and abut against each other, said outer ends being also formed with lateral abutments which are curved to fit the tread portion of the casing and recede from the sides of the casing at the base thereof to provide clearance spaces, spacer elements interposed between the bases of the cushion members and formed with inclined sides which have a wedge action upon the inner side walls of the casing to hold the casing in position upon the rim, and means for binding said cushion members and spacer elements down upon the rim of the wheel in continuous series.

3. In a tire, a plurality of independent and interchangeable cushion members having spaced bases and outer ends which are enlarged circumferentially of the wheel to provide abutting arched portions and also laterally to provide side abutments which are shaped to conform to the tread of the casing and recede inwardly from the sides thereof to provide clearance spaces, wedge shaped spacer members interposed between the bases of the cushion members and provided at the ends thereof with means for interlocking with the cushion members, the sides of the spacer elements wedging the casing against the rim of the wheel, and means for binding said cushion members and spacer members down upon the rim of the wheel.

4. In a tire, a series of similar and interchangeable cushion members adapted to be disposed between the casing and the rim of the wheel, said cushion members being spaced at their bases and having their outer ends enlarged longitudinally to arch over the intervening spaces and abut against each other, said outer ends being also formed with comparatively narrow and radially extending side abutments which are shaped to fit the tread portion of the casing and recede inwardly from the sides of the casing at the base thereof to provide clearance spaces, spacing blocks interposed between the bases of the cushion members and having a wedge shaped formation for wedging the sides of the casing against the rim of the wheel, and means for binding the cushion members and spacing blocks on the rim.

5. In a tire, a series of similar and interchangeable cushion members adapted to be disposed between the casing and the rim of the wheel, said cushion members having spaced bases and enlarged outer ends which arch over the spaces, spacing blocks interposed between the bases of the cushion members and having a detachable and interlocking connection therewith, and means for binding the cushion members and spacing blocks in position on the rim.

6. In a tire, a series of similar and interchangeable cushion members adapted to be disposed between the casing and the rim of the wheel, said cushion members being spaced at their bases and having enlarged outer ends which arch over and bridge the spaces, spacing blocks interposed between the bases of the cushion members and formed with forked ends which engage and interlock with the cushion members, and means for binding the cushion members and spacing blocks on the rim of the wheel.

7. In a tire, a series of similar and interchangeable cushion members adapted to be disposed between the casing and the rim of the wheel, said cushion members being spaced at their bases, spacing blocks interposed between the bases of the cushion members, a flexible cord extending loosely through the cushion members and spacing blocks, a radially disposed pin extending through the rim of the wheel and journaled therein, the ends of the cord being connected to the pin, and said pin having flat sides, a disk slidable on the pin and interlocking with the flat sides thereof, and means for engagement with the disk to lock the pin against rotation.

8. In a tire, a series of similar and interchangeable cushion members adapted to be disposed between the casing and the rim of the wheel, spacing blocks between the cushion members, a flexible cord extending through the spacing blocks and cushion members, a pin journaled in the rim of the wheel and having the flexible cord connected thereto, said pin being formed with a threaded portion and flat sides, a disk slidable on the pin and interlocking with the flat sides thereof, means arranged for engagement with the disk to lock the pin against rotation, and a cap threaded on the pin for holding the disk in operative position.

9. In a tire, a plurality of cushion members and alternating spacer members adapted to be disposed between the casing and the rim of the wheel, and means for binding said members down onto the rim of the wheel and effectively wedging said spacer members between the walls of the casing and at the rim of the wheel; said spacer elements being provided with prongs at each end embracing the adjacent cushion members.

In testimony whereof, we have signed our names to this specification in the presence of two subscribing witnesses.

JOSEPH N. McFATE.
HERBERT L. GLAZE.

Witnesses:
WILLIS S. MITCHELL,
J. SHUTT.